United States Patent
Abe et al.

(10) Patent No.: US 6,959,366 B2
(45) Date of Patent: Oct. 25, 2005

(54) DEVICE CONTROL METHOD, DATA TRANSFER APPARATUS AND RECORDING MEDIUM

(75) Inventors: Miki Abe, Kanagawa (JP); Takafumi Hosoi, Tokyo (JP); Eiichiro Morinaga, Tokyo (JP); Masao Tanaka, Kanagawa (JP)

(73) Assignee: Sony Corporation, Tokyo (JP)

(*) Notice: Subject to any disclaimer, the term of this patent is extended or adjusted under 35 U.S.C. 154(b) by 286 days.

(21) Appl. No.: 10/363,299

(22) PCT Filed: Jun. 27, 2002

(86) PCT No.: PCT/JP02/06484

§ 371 (c)(1),
(2), (4) Date: Feb. 28, 2003

(87) PCT Pub. No.: WO03/005359

PCT Pub. Date: Jan. 16, 2003

(65) Prior Publication Data

US 2004/0015716 A1    Jan. 22, 2004

(51) Int. Cl.$^7$ ............................................. G06F 13/14
(52) U.S. Cl. ...................... 711/154; 711/155; 711/202; 711/203; 711/204; 711/205; 711/206
(58) Field of Search ................ 711/154–155, 202–206, 711/111–112; 380/211; 382/100; 709/200; 705/50, 51; 713/193

(56) References Cited

U.S. PATENT DOCUMENTS

| | | | |
|---|---|---|---|
| 6,311,214 B1 * | 10/2001 | Rhoads ........................ | 709/217 |
| 6,442,285 B2 * | 8/2002 | Rhoads et al. .............. | 382/100 |
| 6,522,769 B1 * | 2/2003 | Rhoads et al. .............. | 382/100 |
| 6,650,761 B1 * | 11/2003 | Rodriguez et al. .......... | 382/100 |

FOREIGN PATENT DOCUMENTS

| | | |
|---|---|---|
| EP | 1 081 574 | 3/2001 |
| JP | 2000-347851 | 12/2000 |
| JP | 2001-143379 | 5/2001 |

* cited by examiner

Primary Examiner—T Nguyen
(74) Attorney, Agent, or Firm—Frommer Lawrence & Haug LLP; William S. Frommer

(57) ABSTRACT

A data transfer apparatus for simplifying a module structure for controlling a connected data recording apparatus and improving the processing efficiency. A control code issued by a common application module having a main purpose of check-out/check-in is made a control code corresponding to a device connected by a conversion module and transmitted via a device driver. Moreover, for example, a control code issued by a local application module having a main purpose of controlling processing depending on a device connected shares the aforementioned device driver. For example, the local application module issues a control code in a state matched with a control code format converted by the conversion module. Alternatively, the local application module issues a local control code by indicating issuance of a local control code of a format different from the control code format converted by the conversion module.

9 Claims, 8 Drawing Sheets

FIG. 6

| OFFSET (BYTE) | MSB 7 \| 6 \| 5 \| 4 | 3 \| 2 \| 1 \| 0 |
|---|---|---|
| 00h | | CTS(0) | ctype/response |
| 01h | | sub-unit type(03h) | sub-unit ID(0) |
| 02h | opcode | vendor dependent(00h) |
| 03h | operand[0] | (msb) |
| 04h | operand[1] | company ID |
| 05h | operand[2] | (lsb) |
| 06h | operand[3] | company-dependent data field |
| 07h | operand[4] | company-dependent data field |
| 08h | operand[5] | company-dependent data field |
| 09h | operand[6] | company-dependent data field |
| 0Ah | operand[7] | VDC opcode |
| 0Bh | operand[8] | VDC-opcode dependent |
| --- | operand[ ] | |

FIG. 7

| OFFSET (BYTE) | MSB 7 \| 6 \| 5 \| 4 | 3 \| 2 \| 1 \| 0 |
|---|---|---|
| 00h | | CTS(0) | ctype/response |
| 01h | | sub-unit type | sub-unit ID |
| 02h | opcode | vendor dependent(00h) |
| 03h | operand[0] | (msb) |
| 04h | operand[1] | company ID |
| 05h | operand[2] | (lsb) |
| 06h | operand[3] | vendor-dependent data |
| --- | operand[ ] | |

FIG. 8A

| bmRequestType | bRequest | wValue | wIndex | wLength | Data |
|---|---|---|---|---|---|
| 01000001b (41h) | CTL command (80h) | 0000h | 0000h | data length | control command |

FIG. 8B

| bmRequestType | bRequest | wValue | wIndex | wLength | Data |
|---|---|---|---|---|---|
| 11000001b (C1h) | RESP command (81h) | 0000h | 0000h | data length | response command |

FIG. 9A

| bmRequestType | bRequest | wValue | wIndex | wLength | Data |
|---|---|---|---|---|---|
| 01000001b (41h) | device dependent (FFh) | | | | vendor-dependent data |

FIG. 9B

| bmRequestType | bRequest | wValue | wIndex | wLength | Data |
|---|---|---|---|---|---|
| 11000001b (C1h) | device dependent (FFh) | | | | vendor-dependent data |

DEVICE CONTROL METHOD, DATA TRANSFER APPARATUS AND RECORDING MEDIUM

TECHNICAL FIELD

The present invention relates to an apparatus control method, a data transfer apparatus and a recording medium that are suitable for a system in which the data transfer apparatus is connected to a data-recording apparatus and contents data such as music are transferred from the data transfer apparatus to the data-recording apparatus.

BACKGROUND ART

For example, there is an application in which an HDD (hard-disc drive) employed in a personal computer is used as a primary recording medium for storing contents data such as music and the contents data are transferred to another recording medium referred to as a secondary recording medium and recorded on the secondary recording medium to be reproduced and enjoyed later. It is to be noted that the contents data are data mainly to be distributed, transferred and used. Examples of the contents data are music data, video data, game data and computer software.

In this case, the HDD employed in the personal computer is used for storing contents data such as pieces of music, which are reproduced from a package medium such as a CD-DA (Compact Disc Digital Audio) or a DVD (Digital Versatile Disc). As an alternative, the contents data are downloaded to the personal computer from an external music server by way of a communication network, to which the personal computer is connected. Then, the user connects a recording apparatus employing the secondary recording medium to the personal computer to copy or move contents data stored in the HDD to the secondary recording medium. Finally, the user utilizes a reproduction apparatus for the secondary recording medium to reproduce the copied contents data such as music from the recording apparatus (secondary recording medium).

Examples of the secondary recording medium include a memory card using a semiconductor memory such a flash memory, a mini disc used as a magneto-optical disc, a CD-R (CD Recordable), a CD-RW (CD Rewritable) a DVD-RAM, a DVD-R and a DVD-RW.

As the recording apparatus and the reproduction apparatus, which are used for the secondary recording medium, respectively, a recorder and a player have been becoming popular for a wide range of applications. There are a variety of recorders and players such as stationary and portable recording/reproduction apparatus. The user is thus allowed to record and reproduce contents data by using a recording/reproduction apparatus that the user likes or is suitable for an apparatus already owned by the user.

It is to be noted that, when considering such usage of contents data, protection of a copyright of the contents data must be taken into account. Assume for example that the user makes use of a service of distributing contents data to users, purchases a package medium used for recording contents data or obtains contents data in another way, and records the contents data on to the HDD. If the user is allowed to copy the contents data from the HDD to a secondary recording medium without any restrictions, there will be resulted in a situation in which the copyright of the contents data is not protected properly. In order to solve this problem, there have been proposed a variety of technologies and a variety of data-processing rules for protection of a copyright of contents data used in handling of the contents data as digital data. One of the rules is called an SDMI (Secure Digital Music Initiative).

A data path of contents data prescribed by the SDMI standard will be described later. Network contents and disc contents are transferred to a secondary recording medium and recorded onto the secondary recording medium appropriately by considering protection of copyrights of the contents data and interests of general users or rights to copy the contents data for private use. Network contents are contents data distributed from an external server to a personal computer by way of a network and stored in the personal computer's HDD serving as a primary recording medium. On the other hand, disc contents are contents data reproduced from the personal computer's disc drive unit such as a CD-ROM drive, or contents data reproduced from a package medium such as a CD-DA or a DVD mounted on a disc drive unit connected to such a personal computer.

By the way, in a process to transfer contents data from a primary recording medium such as an HDD to a secondary recording medium such as a mini disc or a memory card and record the contents data onto the secondary recording medium, efforts are made to consider both protection of a copyright of the contents data and a right to copy the contents data for private use. That is to say, contents data are transferred to a secondary recording medium conforming to the SDMI standard described above as follows.

A memory card, which uses a semiconductor memory such as a flash memory and conforms to the SDMI standard, can be assumed to be an example of a secondary recording medium conforming to the SDMI standard. In such a secondary recording medium, contents are recorded in an encrypted state. SDMI-conforming contents are encrypted before being recorded onto a primary recording medium such as an HDD. Thus, SDMI-conforming contents are copied to a secondary recording medium in an encrypted state as it is.

It is needless to say that a reproduction apparatus for the secondary recording medium has a decryption function. Thus, the reproduction apparatus is capable of reproducing the contents data from the secondary recording medium, which have been copied to the secondary recording medium in an encrypted state.

In addition, the format of a secondary recording medium conforming to the SDMI standard includes an area for recording contents IDs each serving as an identifier for contents data recorded on the secondary recording medium.

Contents ID is generated by an apparatus for a primary recording medium for each contents data recorded on the HDD used as the primary recording medium and stored in the primary recording medium along with the contents data. When the contents data are copied to a secondary recording medium, the contents ID for the contents data are also recorded onto the secondary recording medium as well.

Contents IDs are used in management of contents rights in the primary recording medium and the secondary recording medium. Contents right in the primary recording medium is a right to transfer (or copy) contents data to the secondary recording medium. On the other hand, contents right in the secondary recording medium is a right to reproduce copied contents data.

It is to be noted that, in the following description, a transfer of contents data from a primary recording medium to a secondary recording medium, that is, a transfer of a right, is referred to as a check-out. On the other hand, a return of contents data from a secondary recording medium to a primary recording medium is referred to as a check-in. As will be described later, a check-in is actually only a return of a right.

The SDMI standard sets usage rules for check-outs and check-ins. For example, only up to three check-outs from a primary recording medium to a secondary recording medium can be carried out on contents data. That is to say, the transfer of a right described above can be performed up to three times.

When a check-out is carried out on contents data, the right of the contents data is transferred from a primary recording medium to a secondary recording medium. That is to say, the transfer of a right of the contents data can be carried out only two more times. On the other hand, the secondary recording medium obtains a right to reproduce the contents data.

When a check-in is carried out on contents data from a secondary recording medium to a primary recording medium, on the other hand, the right of the contents data is returned from the secondary recording medium to the primary recording medium. That is to say, a right to reproduce the contents data from the secondary recording medium is lost while the number of times the contents data can be transferred from the primary recording medium to a secondary recording medium is incremented by 1.

Such check-outs and check-ins are managed in contents data units by assigning contents ID to each of contents data.

In a check-out of contents data from a primary recording medium to a secondary recording medium, the contents data and the contents ID of the contents data are recorded onto the secondary recording medium in order to allow the contents data to be reproduced from the secondary recording medium, that is, in order to give the secondary recording medium a right to reproduce the contents data. In the primary recording medium, on the other hand, the check-out is regarded as one transfer of contents ID, and the number of transfers allowable by the usage rule is decremented by 1.

In a check-in, contents data are not actually returned to the primary recording medium. Instead, the contents data are deleted from the secondary recording medium and, in the primary recording medium, the check-in is regarded as a return of the contents ID of the contents data from the secondary recording medium. Thus, the number of transfers allowable by the usage rule is incremented by 1. In the secondary recording medium, a right to reproduce the contents data from the secondary recording medium is lost.

As described above, contents data in an encrypted state is copied to a secondary recording medium and recorded onto the secondary recording medium, which conforms to the SDMI standard, as it is. In addition, a right of contents is managed in every check-in and every check-out. Thus, a copyright can be protected by avoidance of copy operations without restrictions. At the same time, the user's right to copy contents data for private use is assured.

It is to be noted that contents data are downloaded from typically an external server to an HDD used as a primary recording medium in a state of being encrypted by using a contents key CK.

In the description of this specification, contents data recorded in an HDD used as a primary recording medium is assumed to be A3D contents data encrypted by using a contents key CK. A3D contents data are contents data compressed by adoption of an ATRAC3 technique. It is needless to say, however, that contents data may be compressed by using a compression method other than the ATRAC3 technique.

In addition, in the description of this specification, symbol E (x, y) denotes data y encrypted by adoption of a key x. On the other hand, symbol D {x, E (x, y)} denotes data obtained as a result of decrypting data E (x, y) by adoption of the key x.

Thus, symbol E (CK, A3D) denotes data obtained as a result of encrypting contents data A3D by adoption of a contents key CK. As described above, the A3D contents data are contents data compressed by adoption of the ATRAC3 compression technique. On the other hand, symbol D {CK, E (CK, A3D)} denotes data obtained as a result of decrypting data E (CK, A3D) by adoption of the contents key CK.

In addition, an HDD serving as a primary recording medium is used for storing also E (KR, CK) along with the encrypted contents data E (CK, A3D). Symbol E (KR, CK) denotes the contents key CK encrypted by adoption of a root key KR. Thus, the encrypted contents key E (KR, CK) is downloaded from an external server to the HDD along with the encrypted contents data E (CK, A3D).

In this case, when the encrypted contents data E (CK, A3D) is transferred from the HDD serving as a primary recording medium to a secondary recording medium, the encrypted contents key E (KR, CK) needs to be also transmitted to the secondary recording medium as well.

The apparatus for the secondary recording medium has the root key KR and is thus capable of decrypting the encrypted contents key E (KR, CK) by using the root key KR to produce the contents key CK, which is then used to decrypt the encrypted contents data.

However, the root key KR may be varied in accordance with the will of the copyright owner or in accordance with a variety of changes in condition. For example, the set root key KR may vary from contents data to contents data. A function to limit contents distribution destinations can be executed by carrying out a process of the root key KR. However, details of this process are not explained in this specification.

In order to carry out a process of the root key KR, data called an EKB (Enabling Key Block) is also distributed. For example, an ordinary terminal apparatus to receive contents data adopts a technique allowing a root key to be verified by using a received EKB. That is to say, an EKB is also distributed by a server along with the aforementioned encrypted contents data and the aforementioned encrypted contents key to an apparatus and stored onto the HDD employed in the apparatus.

In this case, consider a case in which a mini disc or a magneto-optical disc, which has been becoming popular in a wide range of applications, is used as a secondary recording medium.

To be more specific, as an example, let a mini-disc-recording apparatus conform to the SDMI standard. The apparatus records encrypted contents data E (CK, A3D) transferred from a primary recording medium in a check-out onto a mini disc thereof in an encrypted state as it is.

In a reproduction process, the mini-disc-reproduction apparatus conforming to the SDMI standard generates D {CK, E (CK, A3D)}, which is the contents data A3D itself. Then, the mini-disc-reproduction apparatus carries out a predetermined decoding process on the contents data A3D to reproduce and output typically music of the contents data.

On the other hand, an ordinary mini-disc system, which has been becoming popular, does not record encrypted contents onto a mini disc thereof. It is needless to say that such a mini-disc-reproduction apparatus does not have a function to decrypt encrypted contents data either.

Thus, even if contents data can be recorded on a mini disc by a mini-disc-recording apparatus conforming to the SDMI standard, the contents data recorded on a mini disc cannot be reproduced by a large number of mini-disc players not conforming to the SDMI standard. This is because there is no reproduction compatibility between the mini-disc-recording apparatus conforming to the SDMI standard and the mini-disc players not conforming to the SDMI standard.

This reproduction incompatibility restricts proper use of SDMI contents purchased by the general user and, hence, substantially reduces the value of a service to provide the SDMI contents to the general user and the degree of user satisfaction.

In order to solve the problem described above, when SDMI contents are recorded onto a secondary recording medium of a mini-disc-recording apparatus not conforming to the SDMI standard in a copy operation, there is conceived a technique wherein the contents data are decrypted before being transferred to the apparatus and finally recorded onto a mini disc used as the secondary recording medium in an unencrypted state as it is.

If the above technique to copy contents data is adopted, however, the contents data can be copied with ease. Thus, there is inevitably room for illegally copying contents data. As a result, the original object of the SDMI standard to protect copyrights cannot be achieved.

Thus, in order to solve the problems described above, the applicant for a patent of the present invention has proposed the following transfer technique as a means for transferring contents data.

In a process to transfer contents data, the primary-recording-medium-side apparatus serving as a data transfer apparatus authenticates the secondary-recording-medium-side apparatus serving as a data-recording apparatus, and a transfer of the contents data is permitted on condition that the result of the authentication is OK and the contents provider such as the copyright owner approves the transfer. The contents data are then transferred through a transmission line in an encrypted state but decrypted before being recorded on a secondary recording medium of the data-recording apparatus. In addition, in accordance with this proposed technique, contents rights are managed in every check-out and every check-in.

Thus, an operation to copy and record contents data in an unencrypted state is permitted and the function to protect a copyright of the contents data is not lost.

In actuality, a transfer of contents from an HDD used as a primary recording medium in a personal computer serving as the data transfer apparatus to a mini disc used as a secondary recording medium in a mini-disc recorder serving as a data-recording apparatus by adoption of the technique described above is beneficial to both the contents provider and the user.

By the way, in a data transfer system adopting the technique described above, there is a variety of recording media such as a memory card and a mini disc, which can be utilized by the user as a secondary recording medium at a destination of a check-out of contents data. In such a data transfer system, a data-recording apparatus or a mini-disc recorder is connected arbitrarily to the personal computer, allowing a check-out and a check-in to be carried out.

In this case, it is necessary to provide the personal computer serving as the data transfer apparatus with a function for controlling check-outs and check-ins of contents data in conjunction with a variety of data-recording apparatus such as a memory-card-recording apparatus or a mini-disc recorder and controlling processes of contents data on the secondary recording medium of the data-recording apparatus.

In other words, the personal computer serving as the data transfer apparatus is required to have application software capable of transmitting commands or control codes provided for each of various secondary-recording-medium-side apparatus to the secondary-recording-medium-side apparatus.

In the present state of the art, however, the memory-card-recording apparatus and the mini-disc recorders do not share standardized formats such as control-code forms and command-frame structures for control commands issued by the application software.

Because of the reason described above, in the case of an application intended mainly for check-outs and check-ins of contents data, it is necessary to provide independent application for each secondary-recording-medium-side apparatus connected to the personal computer.

In addition, since a variety of secondary-recording-medium-side apparatus exists, it is necessary to also provide a separately local application intended mainly for controlling various kinds of processing dependent on the types of the secondary-recording-medium-side apparatus. Examples of the processing dependent on the types of the secondary-recording-medium-side apparatus are processes to reproduce, record and edit contents data.

In this case, there exist independent control-code forms and independent command-frame structures for control commands issued by the application issued by the application for the purpose of mainly carrying out check-outs and check-ins and control commands issued by the local application for the purpose of mainly controlling the processing dependent on the types of the secondary-recording-medium-side apparatus.

In consequence, it is necessary to carry out a complicated process to switch the application from one to another and a device driver from one to another in dependent on the processing.

DISCLOSURE OF INVENTION

It is thus an object of the present invention addressing the problems described above to simplify a software structure and to make processing efficient by providing a module structure for control executed by a data transfer apparatus on a data-recording apparatus connected to the data transfer apparatus.

In accordance with an aspect of the present invention, there is provided an apparatus control method adopted by a data transfer apparatus to control a data-recording apparatus connected to the data transfer apparatus, wherein: the data transfer apparatus includes a primary recording medium in which contents data have been stored; the data-recording apparatus is capable of recording contents data onto a secondary recording medium; and the contents data stored on the primary recording medium can be transferred to the secondary recording medium by connecting the data-recording apparatus to the data transfer apparatus, wherein a first control procedure or a second control procedure is selectively executed in accordance with a control condition, the first control procedure including the steps of:
using a common application module to issue a control code according to a common control condition independently of a type of the secondary recording medium;
using a transformation module to transform the control code in accordance with the data-recording apparatus connected to the data transfer apparatus; and transmitting the transformed control code to the data-recording apparatus connected to the data transfer apparatus by way of a device driver;

the second control procedure including the steps of:

using a local application module to issue a control code in accordance with a control condition not prepared in the common application module; and transmitting the issued control code to the data-recording apparatus connected to the data transfer apparatus by way of the device driver.

Preferably, in the second control procedure, the local application module issues the control code having a format adjusted to that of the control code transformed by the transformation module.

Preferably, in the second control procedure, the local application module presents that a local control code having a format different from that of the control code transformed by the transformation module is to be issued and issues the local control code.

In accordance with another aspect of the present invention, there is provided a data transfer apparatus comprising:

primary-recording-medium-driving means for recording data onto a primary recording medium and reproducing data from the primary recording medium;

communication means for carrying out operations to exchange various kinds of data with an external data-recording apparatus for recording data onto a secondary recording medium and specially carrying out an operation to transfer contents data recorded on the primary recording medium; and connected-apparatus control means for transmitting a control code to a variety of data-recording apparatus connectable to the data transfer apparatus in a state of being capable of communicating with the data transfer apparatus through the communication means, and for controlling the data-recording apparatus connected to the data transfer apparatus, wherein the connected-apparatus control means includes:

a common application module for issuing a control code according to a common control condition independently of a type of the secondary recording medium;

a transformation module for transforming the control code issued by the common application module in accordance with the data-recording apparatus connected to the data transfer apparatus;

a local application module for issuing a control code in accordance with a control condition not prepared in the common application module; and a device driver for transmitting the transformed control code transformed by the transformation module and the issued control code issued by the local application module to the data-recording apparatus connected to the data transfer apparatus.

Preferably, the local application module issues the control code having a format adjusted to that of the control code transformed by the transformation module.

Preferably, the local application module presents that a local control code having a format different from that of the control code transformed by the transformation module is to be issued and issues the local control code.

In accordance with further another aspect of the present invention, there is provided a recording medium for a recording program module to be executed by a data transfer apparatus including a primary recording medium in which contents data have been stored, in order to control a data-recording apparatus which is connected to the data transfer apparatus and which is used for recording contents data onto a secondary recording medium in a state allowing contents data recorded on the primary recording medium to be transferred to the secondary recording medium by connecting the data-recording apparatus to the data transfer apparatus, the program module comprising:

a common application module for issuing a control code according to a common control condition independently of a type of the secondary recording medium;

a transformation module for transforming the control code issued by the common application module in accordance with the data-recording apparatus connected to the data transfer apparatus;

a local application module for issuing a control code in accordance with a control condition not prepared in the common application module; and a device driver for transmitting the transformed control code transformed by the transformation module and the issued control code issued by the local application module to the data-recording apparatus connected to the data transfer apparatus.

Preferably, the local application module issues the control code having a format adjusted to that of the control code transformed by the transformation module.

Preferably, the local application module presents that a local control code having a format different from that of the control code transformed by the transformation module is to be issued and issues the local control code.

In accordance with the present invention, a control code issued by the common application module for the purpose of mainly carrying out typically check-outs and check-ins is transformed by the transformation module into a control code suitable for a data-recording apparatus connected to the data transfer apparatus and transmitted to the data-recording apparatus by way of the device driver.

On the other hand, a control code issued by the local application module for the purpose of mainly controlling processing dependent on the data-recording apparatus is also transmitted to the data-recording apparatus by way of the same device driver.

BRIEF DESCRIPTION OF DRAWINGS

FIG. 6 is an explanatory diagram showing a transformed command frame issued by a plug-in module provided by the embodiment;

FIG. 7 is an explanatory diagram showing a transformed command frame issued by a local application provided by the embodiment;

FIGS. 8A and 8B are explanatory diagrams showing the embodiment's send control command and receive response command respectively; and FIGS. 9A and 9B are explanatory diagrams showing the embodiment's send vendor command and receive vendor command respectively.

BEST MODE FOR CARRYING OUT THE INVENTION

A preferred embodiment of the present invention is explained in chapters arranged in the following order:
1: System Configuration
2: Data Paths of SDMI contents
3: Typical Configuration of Data Transfer Apparatus (Primary-Recording-Medium-Side Apparatus or PC)
4: Typical Configuration of Data-Recording Apparatus (Secondary-Recording-Medium-Side Apparatus or Recording/Reproduction Apparatus)
5: Structure of Application Modules 1: System Configuration The following description explains the configuration of a system implemented by an embodiment of the present invention.

Figure 1:
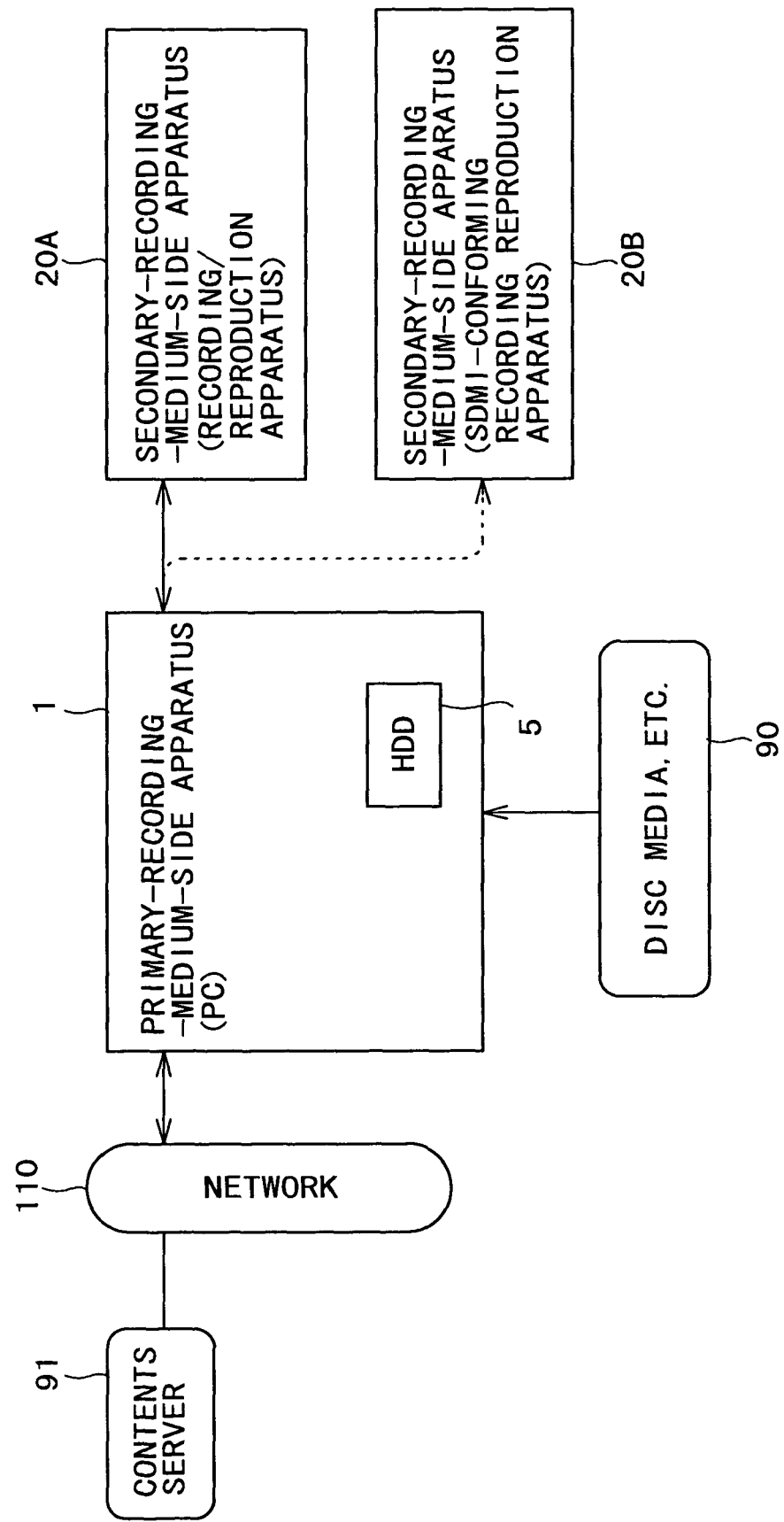
FIG. 1 is a block diagram showing the configuration of a system implemented by an embodiment of the present invention.

FIG. 1 is a diagram showing a typical system configuration. A primary-recording-medium-side apparatus 1 corresponds to a data transfer apparatus provided by the present invention. On the other hand, secondary-recording-medium-side apparatus 20A and 20B each correspond to the data-recording apparatus connected to the data transfer apparatus provided by the present invention. The primary-recording-medium-side apparatus 1 and the secondary-recording-medium-side apparatus 20A or 20B form a data transfer system.

The primary-recording-medium-side apparatus 1 is implemented by typically a personal computer. For the sake of convenience, in the following explanation, by a personal computer, the primary-recording-medium-side apparatus 1 is meant. However, the primary-recording-medium-side apparatus 1 is not necessarily a personal computer.

In order to carry out operations of the data transfer apparatus provided by the present invention, the personal computer functioning as the primary-recording-medium-side apparatus 1 executes software for implementing transfers and accumulation of SDMI contents data, which are initiated in the personal computer 1. In addition, a group of application modules is activated by the personal computer to carry out functions of an apparatus for controlling operations of the secondary-recording-medium-side apparatus 20A and 20B connected to the personal computer. The controlled operations include check-outs and check-ins in conjunction with the secondary-recording-medium-side apparatus 20A and 20B as well as processing to reproduce contents data from the secondary recording medium and recording contents data onto the secondary recording medium and edit contents data stored on the secondary recording medium.

An HDD 5 embedded in or externally added to the personal computer 1 serves as the primary recording medium (and a primary-recording-medium drive means). It is to be noted that, while the HDD 5 is used as the primary recording medium in the explanation of the embodiment, a recording medium functioning as the primary recording medium is not necessarily an HDD. The primary recording medium can be one of a variety of conceivable recording media such as an optical disc, a magneto-optical disc, a semiconductor memory embedded in the primary-recording-medium-side apparatus 1 and a portable semiconductor memory such as a memory card.

The primary-recording-medium-side apparatus 1 is capable of communicating with a contents server 91 through a communication network 110. Contents data such as music can thus be downloaded from the contents server 91 to the primary-recording-medium-side apparatus 1. It is needless to say that a plurality of contents servers 91 may be connected to the network 110. The user of the personal computer 1 can receive a service to download various kinds of data from any arbitrary one of the contents servers 91.

Contents data downloaded from the contents server 91 to the personal computer 1 can be contents data conforming to the SDMI standard or contents data not conforming to the SDMI standard.

A transmission line forming the network 110 is a wire or radio public communication line. As an alternative, a transmission line forming the network 110 can be a dedicated line connecting the personal computer 1 to the contents server 91. To put it concretely, the network 110 can be the Internet, a satellite communication network, an optical fiber network or any other communication line.

The HDD 5 of the personal computer 1 can be an embedded or externally connected disc drive unit for driving a package medium 90 such as a CD-DA or a DVD, from which contents data such as music are reproduced. In the following description, the package medium 90 is also referred to as a disc 90 or a removable recording medium 90.

The personal computer 1 is connected to a secondary-recording-medium-side apparatus 20A or 20B, to which contents data stored in the HDD 5 can be transferred in a check-out. The secondary-recording-medium-side apparatus 20A or 20B is a recording apparatus or a recording/reproduction apparatus for recording data onto a secondary recording medium. Thus, contents data received from the personal computer 1 can be recorded onto the secondary recording medium in a copy operation.

There are a variety of conceivable examples of the secondary-recording-medium-side apparatus 20A or 20B. In the following description, however, the secondary-recording-medium-side apparatus 20B is a recording apparatus conforming to the SDMI standard.

In the secondary-recording-medium-side apparatus 20B conforming to the SDMI standard, the secondary recording medium is assumed to be a memory card conforming to the SDMI standard. Such a memory card employs a semiconductor memory such as a flash memory. Thus, the secondary-recording-medium-side apparatus 20B is a recording/reproduction apparatus or a memory-card-drive for recording and reproducing data onto and from a memory card conforming to the SDMI standard. In this case, SDMI contents are recorded on the secondary recording medium in an encrypted state.

There is created an information management format including a contents ID stored in the secondary recording medium conforming to the SDMI standard. The contents ID is used as an identifier for identifying SDMI contents. When contents data are stored in the HDD 5 of the personal computer 1, a contents ID is generated by an application for the contents data and stored in the HDD 5 along with the contents data. In addition, check-outs and check-ins are managed by using contents IDs. It is assumed that, when contents data are recorded onto the secondary recording medium conforming to the SDMI standard, the contents ID of the contents data can also be recorded onto the secondary recording medium along with the contents data.

On the other hand, the secondary-recording-medium-side apparatus 20A is a data-recording apparatus not conforming to the SDMI standard. The secondary recording medium of the secondary-recording-medium-side apparatus 20A is used for storing SDMI contents, which require protection of its copyright, in an unencrypted state. An example of this secondary-recording-medium-side apparatus 20A is a mini disc. Thus, an example of the secondary-recording-mediumside apparatus 20A is a mini-disc recording/reproduction apparatus or a mini-disc recorder.

In this case, in order not to lose a function to protect a copyright even if SDMI contents are recorded in an unencrypted state, successful authentication to be described later is taken as one of conditions for an operation to copy the SDMI contents.

It is to be noted that a medium, which data are recorded onto and reproduced from by the secondary-recording-medium-side apparatus 20A, is not limited to a mini disc. Other secondary recording media of the secondary-recording-medium-side apparatus 20A conceivably include a memory card employing a semiconductor memory such as a flash memory, a mini disc functioning as a magneto-optical disc, a CD-R (CD Recordable), a CD-RW (CD Rewritable), a DVD-RAM, a DVD-R and a DVD-RW. Thus, the secondary-recording-medium-side apparatus 20A can be any recording apparatus as long as the recording apparatus is capable of recording data onto any one of these recording media.

The personal computer 1 is connected to the secondary-recording-medium-side apparatus 20A or 20B by a line conforming to a transmission standard such as the USB (Universal Serial Bus) or IEEE-1394 standard. It is needless to say that another kind of transmission line can also be used as long as the other transmission line is capable of transmitting contents data or the like. Examples of the other transmission line are a wire transmission line and a radio transmission line.

It is to be noted that, in the following description, if it is necessary to distinguish the secondary-recording-medium-side apparatus 20A and 20B from each other, the secondary-recording-medium-side apparatus 20A is referred to as a mini-disc recorder 20A while the secondary-recording-medium-side apparatus 20B is referred to as a memory-card drive 20B in some cases.

2: Data Paths of SDMI Contents

Assume for example a data transfer system like one shown in FIG. 1. In this case, data paths prescribed by the SDMI standard are shown in FIG. 2.

It is to be noted that music contents go through the data path in processing carried out by the personal computer 1, which is provided with typically the HDD 5 as the primary recording medium, to store the music contents onto the HDD 5 or to transfer the contents to an external apparatus such as the secondary-recording-medium-side apparatus 20A or 20B. In other words, the data paths are implemented by software executed by the personal computer 1 to carry out processing to store the music contents onto the HDD 5 or to transfer the contents to the external apparatus.

Figure 2:
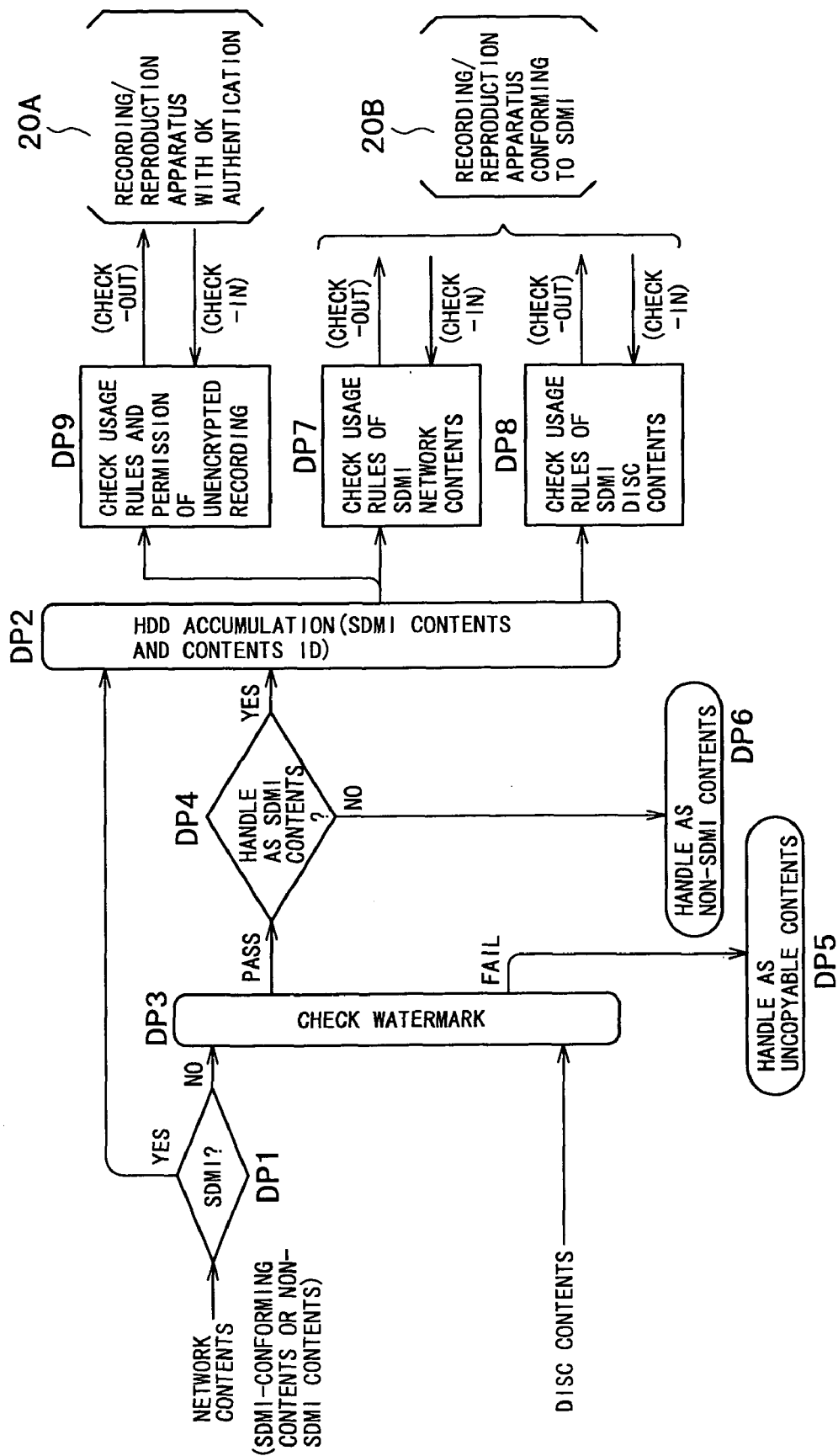
FIG. 2 is an explanatory diagram showing typical data paths of SDMI contents according to the embodiment.

Procedures and processing to store music contents onto the HDD 5 or to transfer the contents to an external apparatus through the data paths shown in FIG. 2 are denoted by reference notations DP1 to DP9. In the following description, reference notations DP1 to DP9 are used to refer to their respective procedures.

In a procedure DP1, contents data distributed by the external contents server 91 by way of the network 110 shown in FIG. 1 are examined to form a judgment as to whether or not the data are contents requiring protection of the copyright in conformity with the SDMI standard.

Distributed network contents can be contents conforming to the SDMI standard or contents having nothing to do with the SDMI standard. Contents conforming to the SDMI standard and contents having nothing to do with the SDMI standard are referred to as SDMI-conforming contents and non-SDMI contents respectively.

SDMI-conforming contents have been encrypted by using a contents key CK in a key encryption process such as a DES process. Typically, the pre-encryption data of SDMI-conforming contents are encoded data A3D compressed by using a compression technique such as ATRAC3. In this case, the encrypted SDMI-conforming contents are expressed by reference notation E (CK, A3D).

If the distributed network contents are SDMI-conforming contents, the data path continues from the procedure DP1 to a procedure DP2, in which the network contents are stored as SDMI contents in the HDD 5 serving as the primary recording medium.

In this case, the contents data are written into the HDD 5 in the distributed state E (CK, A3D) as it is. As an alternative, the contents data are once decrypted before being encrypted again by using another contents key CK' to generate encrypted data E (CK', A3D) to be stored onto the HDD 5. That is to say, the contents key is changed from CK to CK'.

If the distributed network contents are non-SDMI contents, on the other hand, the data path continues from the procedure DP1 to a procedure DP3, in which a watermark-check process is carried out. The watermark-check process is a screening process based on an electronic watermark.

Also in the procedure DP3, a watermark-check process is carried out on disc contents. Disc contents are contents data read out from a package medium mounted on a drive embedded in the personal computer 1 or mounted on a disc drive unit connected to the personal computer 1. An example of the embedded drive is a CD-ROM drive. Examples of the package medium include a CD-DA and a DVD.

That is to say, for disc contents, which are contents data not conforming to the SDMI standard, a watermark-check process is carried out.

If the disc contents does not pass the watermark-check process, the data path continues from the procedure DP3 to a procedure DP5 in which the disc contents are determined to be contents data that cannot be copied in the data paths. A variety of conceivable concrete handlings can be implemented through the design of software. For example, such disc contents are stored into the HDD 5 but treated like contents data that cannot be transferred for the purpose of copying or moving the data to another medium. As an alternative conceivable handling, such disc contents are not stored in the HDD 5 in the contents processing conforming to the SDMI standard.

If the contents data pass the watermark-check process, that is, if an electronic watermark exists and a copy control bit is confirmed to indicate that a copy operation is permitted, on the other hand, the contents data are determined to be contents data that can be copied legally. In this case, the data path continues to a procedure DP4 to form a judgment as to whether or not the contents data are to be handled in conformity with the SDMI standard. Whether or not contents data are to be handled as data conforming to the SDMI standard is dependent on the software design, a user setting or the like.

If the contents data are not to be handled in conformity with the SDMI standard, the data path continues to a procedure DP6 in which the contents data are treated as non-SDMI contents and excluded from the contents-data path conforming to the SDMI standard. For example, a transfer of the contents data to a recording apparatus not conforming to the SDMI standard is enabled.

If the contents data are to be handled in conformity with the SDMI standard, on the other hand, the data path continues from the procedure DP4 to the procedure DP2 in which the contents data is encrypted and stored into the HDD 5 as SDMI contents. To be more specific, the contents data are stored into the HDD 5 typically in an E (CK, A3D) or E (CK', A3D) state.

In accordance with the data paths described above, SDMI network contents or SDMI disc contents are stored into the HDD 5, which is used as a primary recording medium. SDMI network contents are contents, which are received from the network 110 and to be handled in conformity with the SDMI standard. On the other hand, SDMI disc contents are contents, which are read out from a disc such as a CD-DA or another medium and to be handled in conformity with the SDMI standard.

In addition, for SDMI contents, a contents ID unique to the SDMI contents is generated and stored into the HDD 5 along with the SDMI contents. The contents ID is used in management of usage rules, which is executed for each SDMI contents as will be described later.

In accordance with a predetermined rule, SDMI contents stored in the HDD 5 is transferred to the secondary-recording-medium-side apparatus 20B conforming to the SDMI standard so that the contents can be copied to a secondary recording medium also conforming to the SDMI standard. As described above, SDMI contents can be SDMI network contents or SDMI disc contents. In addition, in the case of this embodiment, besides the secondary-recording-medium-side apparatus 20B conforming to the SDMI standard, the SDMI contents stored in the HDD 5 can also be transferred to the secondary-recording-medium-side apparatus 20A under a predetermined condition. Examples of the secondary-recording-medium-side apparatus 20A and 20B are a mini-disc recorder and a memory-card drive respectively.

First of all, assume that the personal computer 1 employing the HDD 5 is connected to the secondary-recording-medium-side apparatus 20B conforming to the SDMI standard. In this case, SDMI contents stored in the HDD 5 is transferred to the secondary-recording-medium-side apparatus 20B as follows.

In the case of SDMI disc contents, a usage rule for transferring the contents is determined in advance. In a procedure DP8, the transfer of the SDMI disc contents according to the usage rule to the secondary-recording-medium-side apparatus 20B conforming to the SDMI standard for the purpose of copying the contents to the secondary-recording-medium-side apparatus 20B is recognized.

It is to be noted that these data paths are paths of a check-out or an operation to transfer contents from the HDD 5 serving as a primary recording medium to a secondary recording medium such as a memory card mounted on the secondary-recording-medium-side apparatus 20B or the secondary-recording-medium-side apparatus 20A to copy the contents to be reproduced by the secondary-recording-medium-side apparatus 20B or 20A. An operation opposite to a check-out is a check-in, which is an operation to transfer or move contents from the secondary recording medium back to the primary recording medium. It is worth noting that, in such a move operation to transfer contents from the secondary recording medium back to the primary recording medium, the contents data are erased from the secondary recording medium.

As a usage rule of a transfer of SDMI disc contents, an upper limit is imposed on the number of allowable check-outs. For example, up to three check-outs are permitted for a piece of contents data. Thus, contents can be copied to up to three secondary recording media conforming to the SDMI standard in check-out operations. When contents are moved back from a secondary recording medium to the primary recording medium in a check-in, the number of check-outs carried out so far for the contents data is decremented by 1. Thus, even after contents have been copied to three secondary recording media conforming to the SDMI standard, the contents can be copied again to a secondary recording medium conforming to the SDMI standard provided that the contents have been moved from one of the three secondary recording media in a check-in back to the primary recording medium. That is to say, contents data are permitted to exist in up to three secondary recording media conforming to the SDMI standard.

Also in the case of SDMI network contents, a usage rule for transferring the contents is determined in advance. In a procedure DP7, the transfer of the SDMI network contents according to the usage rule to the secondary-recording-medium-side apparatus 20B conforming to the SDMI standard for the purpose of copying the contents to the secondary-recording-medium-side apparatus 20B is recognized. As a usage rule of a transfer of SDMI network contents, an upper limit is imposed on the number of allowable check-outs as is the case with SDMI disc contents. The upper limit can be the same as or different from the upper limit set for SDMI disc contents. For example, an upper limit of 1 imposed on the number of allowable check-outs is conceivable. In this case, each piece of contents data can be copied only to one secondary recording medium conforming to the SDMI standard. If the contents data are moved back from the secondary recording medium to the primary recording medium in a check-in, the contents data can be copied again to a secondary recording medium conforming to the SDMI standard.

SDMI contents copied in accordance with these usage rules from a primary recording medium to a secondary recording medium conforming to the SDMI standard are transferred through a transmission line in an encrypted state. To be more specific, the SDMI contents are transferred through a transmission line in an E (CK, A3D) or E (CK', A3D) state.

Then, the SDMI contents transferred in an encrypted state is received by the secondary-recording-medium-side apparatus 20B conforming to the SDMI standard to be copied to the secondary recording medium in the encrypted state as it is.

In an operation carried out by the secondary-recording-medium-side apparatus 20B conforming to the SDMI standard to reproduce the SDMI contents copied and recorded to the secondary recording medium, the contents data are read out from the secondary recording medium and decrypted to reproduce the contents data. To put it in detail, the contents data recorded in the secondary recording medium in the E (CK, A3D) or E (CK', A3D) state is decrypted by using the contents key CK or CK' to generate respectively contents data D {CK, E (CK, A3D)}= A3D or D {CK', E (CK', A3D)}=A3D, which are the original unencrypted contents data compressed by using the ATRAC3 compression technique. The original unencrypted compressed contents data A3D is subjected to processing such as a decompression process opposite to the ATRAC3 compression process to carry out demodulation processing to produce output audio data such as music.

As described above, a copyright for contents data conforming to the SDMI standard can be properly protected by the encrypted state of the contents data along the data paths for a check-out of the contents data to the secondaryrecording-medium-side apparatus 20B conforming to the SDMI standard and the encrypted state of the contents data in the secondary recording medium as well as properly protected by copy management executed by checking the usage rules set for contents transfers.

If the secondary-recording-medium-side apparatus 20A is connected to the personal computer 1, on the other hand, the following processing is carried out.

It is to be noted that, as described above, unlike the secondary-recording-medium-side apparatus 20B (such as a memory-card drive) conforming to the SDMI standard, the secondary-recording-medium-side apparatus 20A (such as a mini-disc recorder) records contents data onto a secondary recording medium such as a mini disc in an unencrypted state. Since contents data are recorded onto a mini disc in an unencrypted state, the contents data copied to and recorded on the mini disc can be reproduced by an ordinary mini-disc-reproduction apparatus, which has been becoming popular in general so that more convenience can be offered to the user.

Since contents data are recorded onto a mini disc in an unencrypted state, however, a problem is raised in the protection of the copyright for the contents data. In order to solve this problem, it is necessary to satisfy predetermined conditions for transferring contents data to the secondary-recording-medium-side apparatus 20A.

In order to transfer SDMI network contents to the secondary-recording-medium-side apparatus 20A and record the contents onto a secondary recording medium in an unencrypted state in a copy operation, it is necessary to satisfy the following three transfer conditions for the copy operation:

(1): The secondary-recording-medium-side apparatus 20A shall pass an authentication process, giving an OK authentication result;

(2): The copyright owner shall recognize the copy operation to transfer the contents data to the secondary-recording-medium-side apparatus 20A and record the data onto the secondary recording medium; and (3): The transfer of the contents data shall abide by usage rules set for check-outs and check-ins.

Nevertheless, it is not possible to carry out a copy operation to transfer the contents data to an apparatus other than the secondary-recording-medium-side apparatus 20B conforming to the SDMI standard in an unrestricted manner even if above transfer conditions (1), (2) and (3) are satisfied. In this way, the function to protect a copyright is preserved. In addition, the function to protect a copyright works due to the fact that contents data are transferred through a transmission line in an encrypted state and it is not until the contents data are received by the secondary-recording-medium-side apparatus 20A that the data are decrypted by the secondary-recording-medium-side apparatus 20A.

In a procedure DP9, above transfer conditions (1), (2) and (3) are checked before SDMI network contents are transferred to the secondary-recording-medium-side apparatus 20A.

To put it in detail, the secondary-recording-medium-side apparatus 20A is subjected to a predetermined authentication process. In addition, flag information or the like included in the contents data is examined to verify the copyright owner's intention as to whether or not the copy operation is allowed. Furthermore, the check-out and check-in usage rules are implemented.

SDMI network contents copied to the secondary-recording-medium-side apparatus 20A under the conditions described above are transmitted through a transmission line in an encrypted state as it is. To be more specific, the SDMI network contents are transmitted through the transmission line in an E (CK, A3D) or E (CK', A3D) state.

The encrypted SDMI network contents are received by the secondary-recording-medium-side apparatus (or the mini-disc recorder) 20A having a configuration shown in FIG. 4, described later, and then decrypted by a decryption processing unit 28 to generate the original data A3D compressed by using the ATRAC3 compression technique. Then, the encrypted contents data A3D are subjected to an encoding process carried out by an EFM/ACIRC encoder/decoder 24 included in the configuration shown in FIG. 4 before being supplied to a recording/reproduction unit 25 for recording the data onto a mini disc 100.

Thus, in an operation to reproduce the SDMI contents copied to and recorded on the mini disc 100, the secondary-recording-medium-side apparatus (or the mini-disc recorder) 20A needs to carry out the same decoding processes as an ordinary mini-disc system on data read out from the mini disc 100. The decoding processes include an EFM demodulation process, an ACIRC error correction process and a decompression process adopting a decompression technique as a counterpart of the ATRAC compression technique.

It means that the copied contents data recorded on the mini disc 100 can be reproduced normally by an ordinary mini-disc reproduction apparatus when the mini disc 100 is mounted on the apparatus. That is to say, the user can enjoy the SDMI network contents copied to and recorded on the mini disc 100 by reproduction of the contents by means of an ordinary mini-disc reproduction apparatus not conforming to the SDMI standard.

It is to be noted that, if the transfer of contents is not permitted in accordance with results of checking usage rules in the procedures DP7, DP8 and DP9 in the data paths shown in FIG. 2, the contents are of course not transferred to the secondary-recording-medium-side apparatus 20A or 20B.

Figure 3:
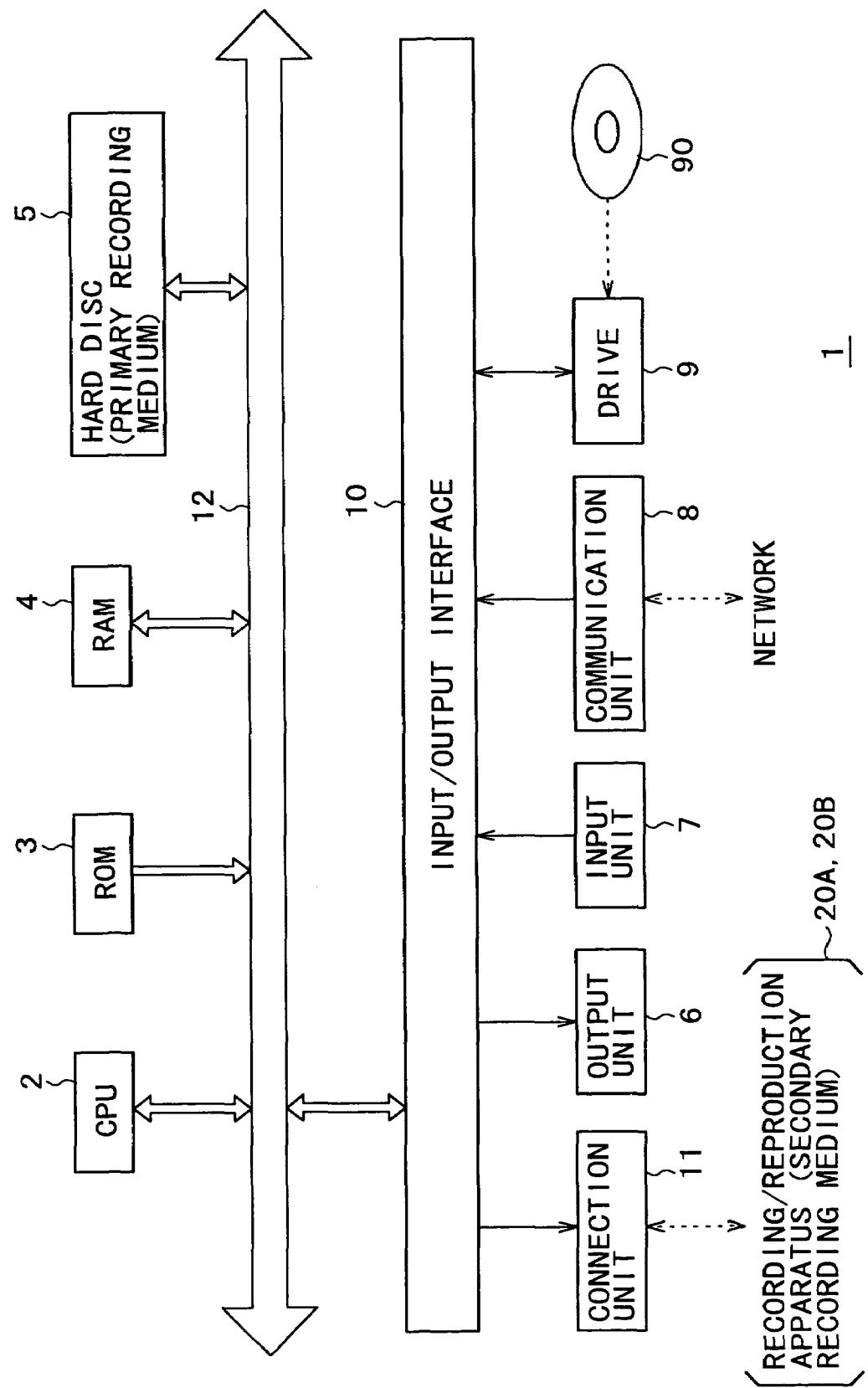
FIG. 3 is a block diagram showing a primary-recording-medium-side apparatus provided by the embodiment.

3: Typical Configuration of Data Transfer Apparatus (Primary-Recording-Medium-Side Apparatus or PC) FIG. 3 is a block diagram showing the configuration of a primary-recording-medium-side apparatus 1 functioning as a data transfer apparatus. The following description explains a personal computer used as the data transfer apparatus 1. By building special-purpose hardware with a configuration for executing the same functions as the primary-recording-medium-side apparatus 1, however, it is also possible to create an apparatus specially used for data transfers.

In this embodiment, software programs to be executed for carrying out functions of the data transfer apparatus are installed on the personal computer 1 to implement a primary-recording-medium-side apparatus as the data transfer apparatus. The software programs are executed by the personal computer to carry out functions of controlling operations of the secondary-recording-medium-side apparatus 20A or 20B connected to the personal computer. The controlled operations include check-outs and check-ins in conjunction with the secondary-recording-medium-side apparatus 20A and 20B as well as processing to reproduce contents data from the secondary recording medium and recording contents data onto the secondary recording medium and edit contents data stored on the secondary recording medium. The software programs form a group of application modules to be described later by referring to FIG. 5.

It is to be noted that, in this specification, a personal computer or a computer has a broad meaning of the so-called general-purpose computer.

A software program to be described later by referring to FIG. 5 can be stored in advance in a recording medium embedded in the computer. Examples of the embedded recording medium are the HDD (hard disc) 5 and a ROM 3.

As an alternative, a software program can be stored temporarily or permanently in a removable recording medium 90 such as a floppy disc, a CD-ROM (Compact Disc Read-Only Memory), an MO (Magneto Optical) disc, a DVD (Digital Versatile Disc), a magnetic disc and a semiconductor memory. A program stored in the removable recording medium 90 is presented to the user as the so-called package software.

It is to be noted that, in addition to the installation of a program from the removable recording medium 90 into the computer, a program can also be downloaded into the computer from a download site by way of an artificial satellite for digital satellite broadcasting by radio communication or by way of a network such as a LAN (Local Area Network) or the Internet by wire communication. In the computer, the downloaded program is received by a communication unit 8 to be installed in the embedded HDD 5.

The computer 1 shown in FIG. 3 includes an embedded CPU (Central Processing Unit) 2. The CPU 2 is connected to an input/output interface 10 by a bus 12. The CPU 2 executes a program stored in a ROM (Read-Only Memory) 3 in advance in accordance with a command entered to the CPU 2 by way of the input/output interface 10 by the user by operating an input unit 7 comprising a keyboard, a mouse and a microphone. As an alternative, the CPU 2 loads a program from the HDD 5 into the RAM (Random-Access Memory) 4 for execution. The program is stored in the HDD 5 from the beginning, received by the communication unit 8 from a satellite or a network and installed in the HDD 5 or read out from the removable recording medium 90 such as an optical disc mounted on a drive 9 and installed in the HDD 5. By executing such a program, the CPU 2 carries out processing of a data transfer apparatus for SDMI contents.

If necessary, the CPU 2 outputs a result of the processing to an output unit 6 comprising an LCD (Liquid Crystal Display) and a speaker or to the communication unit 8 for transmission by way of the input/output interface 10, or records the result into the HDD 5.

In this case, the communication unit 8 is capable of communicating with a variety of servers through the network 110 shown in FIG. 1. To be more specific, the computer 1 is capable of downloading network contents such as music contents from the external contents server 91. The downloaded network contents are subjected to processing for contents conforming to the SDMI standard or processing not conforming to the SDMI standard along the data paths described above. The downloaded network contents completing the processing for contents conforming to the SDMI standard are stored as SDMI contents into the HDD 5. The SDMI contents stored in the HDD 5 are contents to be transferred to the secondary-recording-medium-side apparatus 20B conforming to the SDMI standard or the secondary-recording-medium-side apparatus 20A (the recording/reproduction apparatus) 20A passing an authentication test.

A connection unit 11 is a member connected between the secondary-recording-medium-side apparatus 20A and the secondary-recording-medium-side apparatus 20B so that data can be communicated between the computer 1 and the secondary-recording-medium-side apparatus 20A or the secondary-recording-medium-side apparatus 20B. Conceivable examples of the connection unit 11 are a USB interface and an IEEE-1394 interface. It is needless to say that a wire interface conforming to other standards and a radio interface using an infrared ray or a radio wave can be used as the connection unit 11.

It is to be noted that the various kinds of processing for implementing the data paths described earlier by referring to FIG. 2 do not have to be sequential processing along the time axis, but the processing for implementing the data paths may include pieces of processing to be carried out concurrently or individually. Examples of the processing to be carried out concurrently or individually are concurrent processing and object oriented processing.

A program can be carried out by a single computer or a plurality of computers in the so-called distributed processing. In addition, a program can be transferred to a remote computer to be executed thereby.

4: Typical Configuration of Data-Recording Apparatus (Secondary-Recording-Medium-Side Apparatus or Recording/Reproduction Apparatus)

Figure 4:
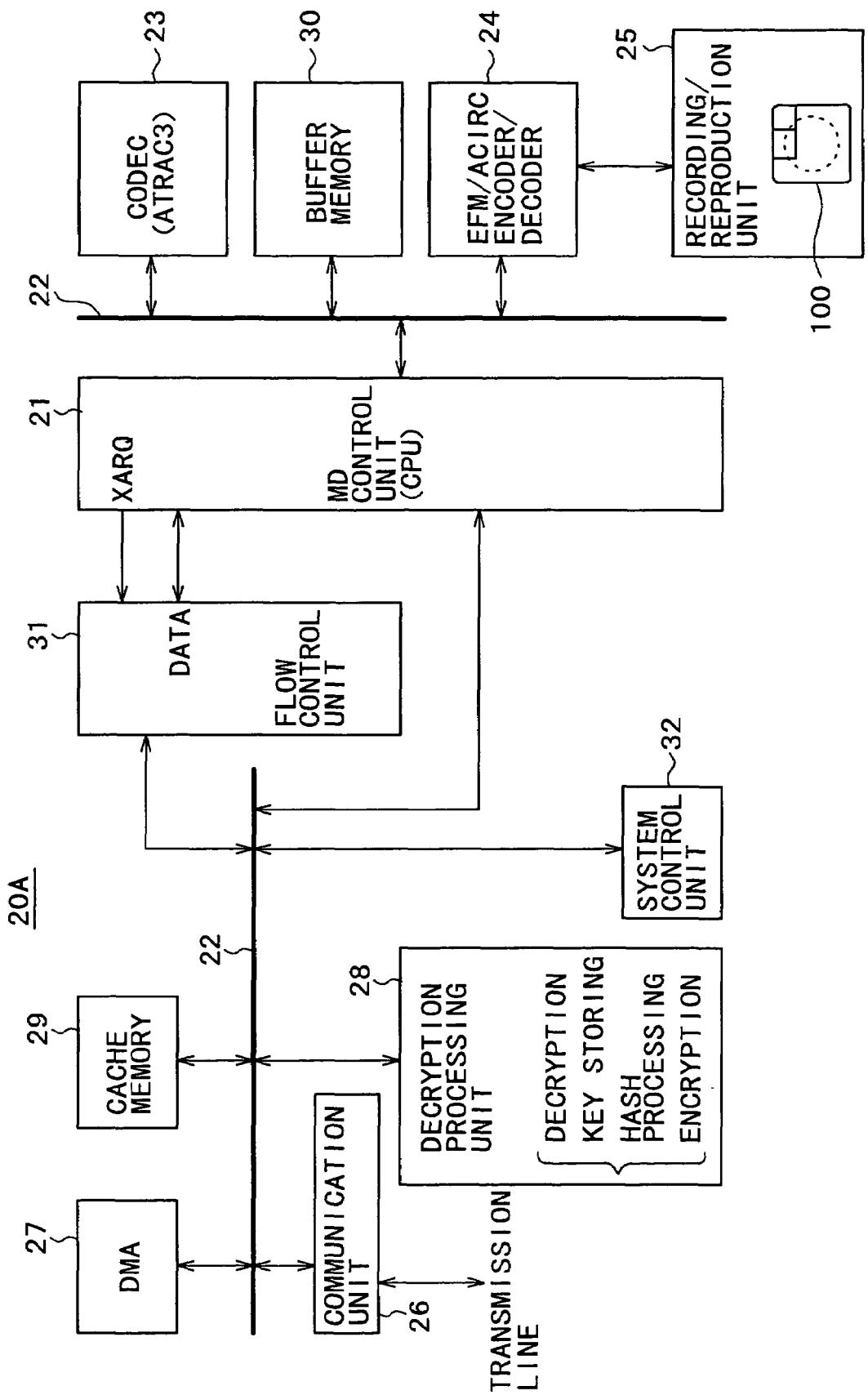
FIG. 4 is a block diagram showing a secondary-recording-medium-side apparatus provided by the embodiment.

FIG. 4 is a block diagram showing a typical configuration of a mini-disc recorder functioning as the secondary-recording-medium-side apparatus 20A. A secondary recording medium 100 is a mini disc or a magneto-optical disc. The secondary recording medium 100 is also referred to hereafter as the mini disc 100.

It is to be noted that FIG. 4 shows the configuration of the secondary-recording-medium-side apparatus 20A including only a system for processing data to be recorded onto or reproduced from the mini disc used as the secondary recording medium 100 and a system processing data transferred from the primary-recording-medium-side apparatus 1. Since other systems such as the driving system, the servo system and the reproduction output system are similar to their respective counterparts employed in the ordinary mini-disc recording/reproduction apparatus, their detailed diagrams are omitted.

In the mini-disc recorder 20A, an MD control unit (CPU) 21 serves as a controller for controlling operations to record and reproduce data onto and from the mini disc 100. To put it concretely, the MD control unit 21 controls a rotation driving mechanism, a spindle servo, a focus servo, a tracking servo, a thread servo, operations to apply a laser beam and a magnetic field to an optical head and a magnetic head respectively and processing to encode data to be recorded and decode reproduced data.

A recording/reproduction unit 25 includes an optical head, a magnetic head, a disc-rotation-driving system and a servo system. In actuality, the recording/reproduction unit 25 serves as a member for recording and reproducing data onto and from the mini disc 100.

An EFM/ACIRC encoder/decoder 24 encodes data to be recorded onto the mini disc 100 and decodes data reproduced from the mini disc 100. As is generally known, in the case of a mini-disc system, data to be recorded are subjected to an EFM modulation process and an encoding process for ACIRC error correction codes. The EFM/ACIRC encoder/decoder 24 carries out an ACIRC encoding process and an EFM encoding process on data to be recorded before supplying the data to the recording/reproduction unit 25.

In a reproduction operation, the EFM/ACIRC encoder/decoder 24 carries out decoding processes on an RF signal representing data read out from the mini disc 100 and supplied to the EFM/ACIRC encoder/decoder 24 by the recording/reproduction unit 25. The decoding processes include binary conversion processing, EFM demodulation processing and error correction processing adopting the ACIRC technique.

A buffer memory 30 buffers data to be recorded onto the mini disc 100 and data reproduced from the mini disc 100. That is to say, the buffer memory 30 has a buffering function commonly known as a shock-proof function.

In an operation to record data, data compressed and encoded by using the ATRAC/ATRAC3 technique are stored temporarily in the buffer memory 30. The data is then read out in predetermined data units intermittently from the buffer memory 30 and supplied to the EFM/ACIRC encoder/decoder 24 to be recorded onto the mini disc 100.

In an operation to reproduce data, data are read out from the mini disc 100 and decoded by the EFM/ACIRC encoder/decoder 24. The decoded data are stored temporarily in the buffer memory 30. The stored data are then read out continuously from the buffer memory 30 and supplied to a codec 23 for carrying out a decompression/decoding process.

The codec 23 is a member for carrying out compression processing and decompression processing based on an encoding process adopting the ATRAC/ATRAC3 technique.

Data to be recorded onto the mini disc 100 are compressed by using the ATRAC/ATRAC3 technique before being subjected to the encoding process. Thus, when the mini-disc recorder 20A receives data not completing compression and encoding processes, the codec 23 carries out the compression and encoding processes by adopting the ATRAC or ATRAC3 technique on the data to be recorded, and supplies the compressed data to the EFM/ACIRC encoder/decoder 24. An example of the data not completing compression and encoding processes is PCM audio data.

Data read out from the mini disc 100 by the recording/reproduction unit 25 and decoded by the EFM/ACIRC encoder/decoder 24 in a reproduction operation are data in a state of being compressed and encoded by adoption of the ATRAC/ATRAC3 technique. The data are supplied to the codec 23 by way of the buffer memory 30. The codec 23 decompresses the data by using a decompression technique as a counterpart of the ATRAC/ATRAC3 technique to generate 16-bit quantized digital audio data having a frequency of 44.1 KHz. The digital audio data is subjected to processing including a D/A conversion process, an analog signal process and an amplification process in an output circuit not shown in the figure to generate a speaker output signal representing reproduced music or the like.

As an alternative, the reproduced signal is output to another apparatus as digital audio data.

The configuration described above includes components of a recording/reproduction apparatus of the ordinary mini-disc system. However, the mini-disc recorder 20A implemented by the embodiment has additional members employed in a personal computer to serve as the primary-recording-medium-side apparatus 1. To be more specific, used for carrying processing such as processes to receive contents data transmitted and decode the data, the members include a communication unit 26, a DMA 27, a decryption processing unit 28, a cache memory 29, a flow control unit 31 and a system control unit 32.

The system control unit 32 (CPU) is a member for controlling the whole mini-disc recorder 20A.

Typically, the system control unit 32 controls processing such as issuance of a request for generation of data and a communication for authentication between the personal computer 1 and the mini-disc recorder 20A, processing to exchange a variety of commands with the personal computer 1 and processing of contents data received from the personal computer 1. In addition, in accordance with the various kinds of control, a command is given to the MD control unit 21 and operations to record and reproduce contents data onto and from the mini disc 100 as well as operations to read out and update management information are controlled.

Not shown in the figure, an operation unit and a display unit are provided as a user interface. The system control unit 32 controls processing to monitor operations carried out by the user on the operation unit, processing carried out in accordance with the operations and display processing of the display unit.

Connected to the connection unit 11 of the personal computer 1 shown in FIG. 3, the communication unit 26 is a member for exchanging data with the personal computer 1. The communication unit 26 processes signals conforming to a communication technique as the USB or IEEE-1394 technique.

Data received by the communication unit 26 from the personal computer 1 includes a variety of commands and SDMI contents.

SDMI contents received by the communication unit 26 are stored in a cache memory 29 by control executed by the DMA (Direct Memory Access) 27. It is to be noted that such contents can of course be stored in the cache memory 29 under control executed by the CPU in place of the DMA 27.

The decryption processing unit 28 is a member for carrying out counterpart processing of the process to encrypt SDMI contents. That is to say, the decryption processing unit 28 decrypts contents data stored in the cache memory 29. The unencrypted contents data are then stored in another area of the cache memory 29.

Since the SDMI contents have been encrypted by using a contents key CK or CK', information usable for recognizing at least the contents key CK or CK' is stored.

Since information usable for recognizing the contents key CK has been stored, the decryption processing unit 28 is capable of decrypting an encrypted SDMI contents received in an encrypted state. The encrypted SDMI contents are E (CK, A3D), which are the contents A3D encrypted by using the contents key CK. The result of the decryption is D {CK, E (CK, A3D)}=A3D, which are data compressed by using the ATRAC3 technique. The data compressed by using the ATRAC3 technique are encoded by the EFM/ACIRC encoder/decoder 24 before being stored by the recording/reproduction unit 25 onto the mini disc 100.

It is to be noted that the SDMI contents are not always data compressed by using the ATRAC3 technique. For example, linear PCM data encrypted by a key CK are conceivable. Thus, there is also a method of inputting transferred contents in the E (CK, PCM) state. In this case, as a matter of course, the decryption processing unit decrypts the encrypted contents in the E (CK, PCM) state to generate D {CK, E (CK, PCM)}=PCM, which are decrypted linear PCM data. In this case, the PCM data are compressed by the codec 23 by using the ATRAC3 technique before being encoded by the EFM/ACIRC encoder/decoder 24 and recorded onto the mini disc 100 by the recording/reproduction unit 25.

A key may be stored in the decryption processing unit 28 in some cases to be used in an authentication process. A public key and a private key may be both stored. The private key is also used in an encryption process.

In addition, the decryption processing unit 28 includes an embedded hash engine for carrying out the so-called hash-function processing in order to generate a contents ID.

A contents ID is identification information for processes carried out by the personal computer 1 to check out and check in the contents data.

The decrypted SDMI contents data are transferred from the cache memory 29 to the flow control unit 31. Examples of the decrypted SDMI contents data are data compressed by the ATRAC3 technique and PCM data.

The flow control unit 31 is a member for transferring the decrypted SDMI contents data to the MD control unit 21 serving as a recording process system for recording the data onto the mini disc 100. The recording process system includes the codec 23, the EFM/ACIRC encoder/decoder 24, the recording/reproduction unit 25 and the buffer memory 30.

The flow control unit 31 transfers the decrypted SDMI contents data upon a request (XARQ) made by the MD control unit 21. The flow control unit 31 adjusts timings of reception of contents data, decryption processing and processing to record data onto the mini disc 100.

A bus line 22 is a communication line allowing various kinds of data to be exchanged among the MD control unit (CPU) 21, the codec 23, the buffer memory 30, the EFM/ACIRC encoder/decoder 24, the flow control unit 31, the DMA 27, the cache memory 29, the communication unit 26, the decryption processing unit 28 and the system control unit 32.

In the above configuration, as SDMI contents data transmitted by the personal computer 1, data in the E (CK, A3D) state or data in the E (CK, PCM) state are decrypted and encoded by the EFM/ACIRC encoder/decoder 24 by using the ATRAC3 technique before being recorded by the recording/reproduction unit 25 onto the mini disc 100.

By the way, in a check-in and a check-out of contents data between the personal computer 1 and the mini-disc recorder 20A and in other communication sessions, a variety of commands are also transmitted.

These commands are received by the communication unit 26 and passed on to the system control unit 32. The system control unit 32 carries out various kinds of processing in accordance with these commands, and transmits a response to each of the commands to the personal computer 1 by way of the communication unit 26.

5: Structure of Application Modules

Figure 5:
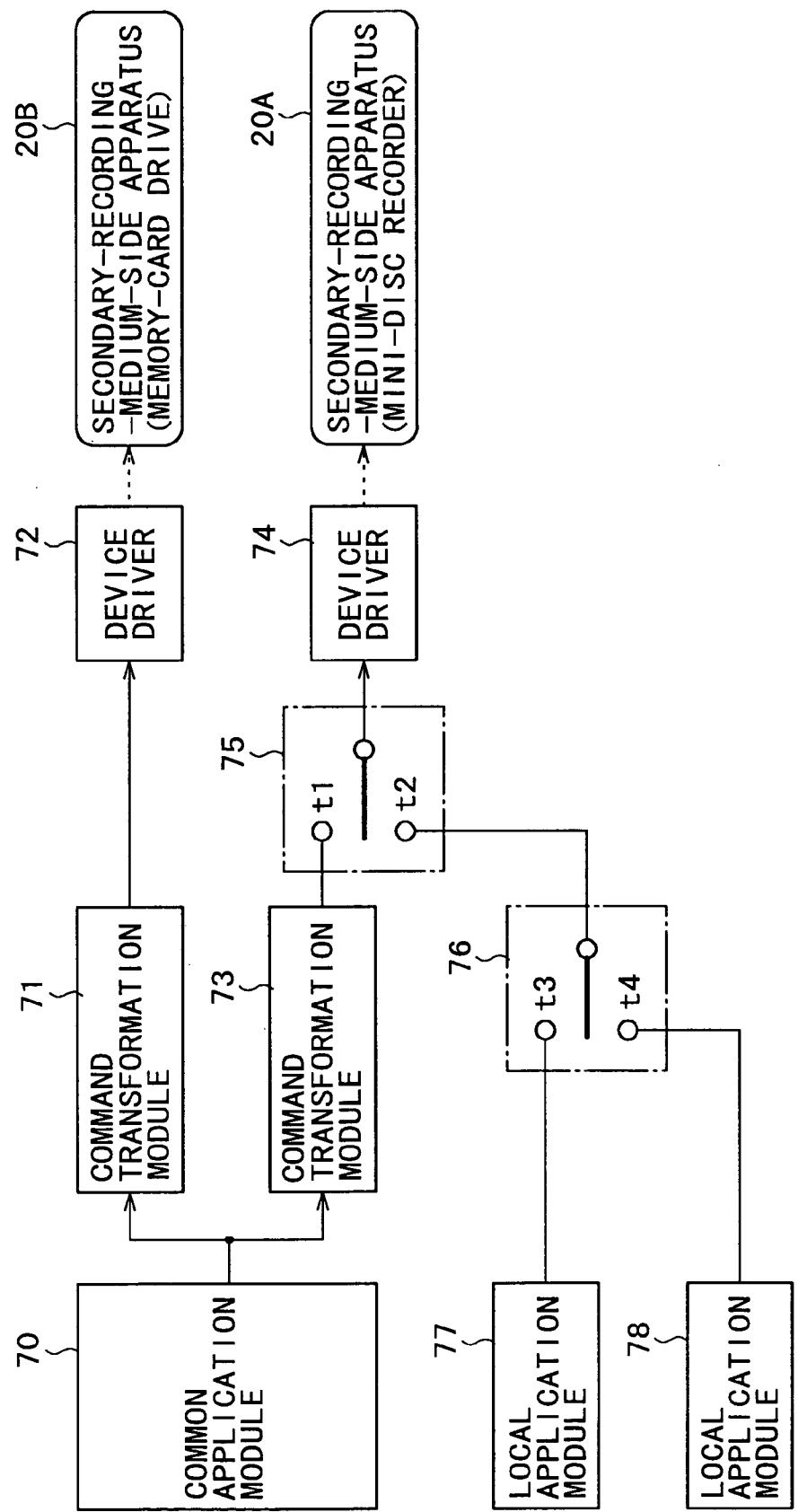
FIG. 5 is an explanatory diagram showing the structure of application modules provided by the embodiment.

By referring to FIG. 5, the following description explains a group of application modules to be executed by the personal computer 1 to control operations of the secondary-recording-medium-side apparatus 20A or 20B connected to the personal computer 1. The controlled operations include check-outs and check-ins in conjunction with the secondary-recording-medium-side apparatus 20A or 20B as well as processing to reproduce contents data from the secondary recording medium and recording contents data onto the secondary recording medium and edit contents data stored on the secondary recording medium.

The group of application modules comprises programs stored in advance in the ROM 3 shown in FIG. 3 and/or programs installed in advance in the HDD 5 shown in FIG. 3. The programs are executed by the CPU 2 employed in the personal computer 1 to execute the control of the secondary-recording-medium-side apparatus 20A and 20B by executing a predetermined process in accordance with the group of application modules.

It is to be noted that a process to edit contents data stored on the mini disc 100 used as the secondary recording medium includes operations to split contents data, join contents data to each other and move contents data.

As shown in FIG. 5, the group of application modules provided by the embodiment comprises a common application module 70, command transformation modules 71 and 73, device drivers 72 and 74, switching functions 75 and 76 and local application modules 77 and 78.

The switching functions 75 and 76 are typically module select functions in a program.

The common application module 70 is an application module intended mainly for controlling a check-out and a check-in of contents data. To put it in detail, with a secondary-recording-medium-side apparatus 20A or 20B connected to the personal computer 1 to be used as an apparatus for recording contents data onto a mini disc or a memory card serving as a secondary recording medium in this data transfer system, the common application module 70 is executed for controlling a check-out and a check-in of contents data as well as a variety of processes accompanying the check-out and the check-in.

The common application module 70 issues a command (or a control code) specifying a common control condition without regard to the type of the secondary-recording-medium-side apparatus connected to the personal computer 1. To be more specific, the common application module 70 issues a variety of commands in accordance with various kinds of control conditions but the commands do not differ with regard to the types of the secondary-recording-medium-side apparatus.

On the other hand, the format of a command issued to a secondary-recording-medium-side apparatus (or a memory-card drive) 20B for driving a memory card used as a secondary recording medium is different from a command issued to a secondary-recording-medium-side apparatus (a mini-disc recorder) 20A for driving a mini disc used as a secondary recording medium. By the format, the code form or the command frame structure is implied. For this reason, the command transformation modules 71 and 73 are each provided to serve as a plug-in module.

The command transformation module 71 is a module for transforming a common command issued by the common application module 70 into a control code and a command frame structure for the memory-card drive 20B and issuing the control code and the command frame structure to the memory-card drive 20B. With the memory-card drive 20B connected to the personal computer 1, the command transformation module 71 transforms a common command issued by the common application module 70 into a command having a format that can be interpreted by the memory-card drive 20B. The command transformation module 71 then supplies the transformed command to the memory-card drive 20B by way of the device driver 72 provided for the memory-card drive 20B.

The common application module 70, the command transformation module 71 and the device driver 72 control check-outs and check-ins carried out in conjunction with the memory-card drive 20B connected to the personal computer 1.

On the other hand, the command transformation module 73 is a module for transforming a common command issued by the common application module 70 into a control code and a command frame structure for the mini-disc recorder 20A and issuing the control code and the command frame structure to the mini-disc recorder 20A.

With the mini-disc recorder 20A connected to the personal computer 1, the command transformation module 73 transforms a common command issued by the common application module 70 into a command having a format that can be interpreted by the mini-disc recorder 20A. The command transformation module 73 then supplies the transformed command to the mini-disc recorder 20A by way of the device driver 74 provided for the mini-disc recorder 20A.

The common application module 70, the command transformation module 73 and the device driver 74 control check-outs and check-ins carried out in conjunction with the mini-disc recorder 20A connected to the personal computer 1. It is to be noted that, when the common application module 70 issues a common command, the switching function 75 is positioned on a t1 side allowing the command transformation module 73 to output the transformed command to the mini-disc recorder 20A by way of the device driver 74.

As a transformed command issued to the mini-disc recorder 20A, a control code is issued by the command transformation module 73 in a command frame like one shown in FIG. 6.

In an operation code at an offset address of 02h, a vendor-dependent code determined by a format license issuer of the apparatus connected to the personal computer 1, that is, the mini-disc recorder 20A in this case is declared.

At the offset address of 0Ah, an actual operation code (or a control code) is described. The actual operation code is the value of the vendor-dependent code VDC. Locations at an offset address of 0Bh and subsequent offset addresses are used as fields each describing an argument of the control code.

At offset addresses of 03h to 05h, a company unique code is prescribed in accordance with typically IEEE specifications as a company ID. The company ID is the code of the format license issuer of the apparatus connected to the personal computer 1, that is, the mini-disc recorder 20A in this case.

Offset addresses of 06h to 09h are each a data field that can be filled up by the format license issuer.

That is to say, a common command is transformed into a command with a control-code format prescribed by the format license issuer format license issuer of the mini-disc recorder 20A. The transformed command is then supplied to the mini-disc recorder 20A.

As described above, the module structure comprises the common application module 70 for issuing a common command and the command transformation modules 71 and 73 each provided as a plug-in module for a corresponding secondary-recording-medium-side apparatus connected to the personal computer 1. The command transformation modules 71 and 73 each transform the common command into a transformed command for the secondary-recording-medium-side apparatus associated with the command transformation module 71 or 73. Thus, it is necessary to provide the personal computer 1 with the common application module 70 as a basic application for controlling check-outs and check-ins as well as the command transformation modules 71 and/or 73 to be each used as a plug-in module for the secondary-recording-medium-side apparatus assumed to be connected to the personal computer 1. In this way, it is possible to implement an extremely efficient and flexible software structure.

At any rate, the common application module 70 issues a common command including a control code indicating control to be executed as control common to a variety of the secondary recording media.

However, one may assume that a control code is to be issued for a case in which a special secondary-recording-medium-side apparatus is connected to the personal computer 1. This is because the secondary recording media have characteristics different from each other and, since the special secondary-recording-medium-side apparatus has a function for handling a secondary recording medium having a specific characteristic, the secondary-recording-medium-side apparatus is required for the secondary recording medium. In this case, it is desirable to issue a local command, that is, a control code with a control condition that cannot be issued by the common application module 70. For this reason, it is necessary to provide the personal computer 1 with a local application module suited for the secondary recording medium having a specific characteristic.

In this embodiment, if the mini-disc recorder 20A is connected to the personal computer 1, a control command specifying a control code is issued by the local application module 77 or 78. This control command is dependent on the secondary recording medium. An example of this control command is a command to edit contents data on the secondary recording medium, which is the mini disc 100 in this case.

The local application module 77 is a module for transforming a local command such as a command to edit contents data on the secondary recording medium into a transformed command with a format adjusted to that tailored to the mini-disc recorder 20A as shown in FIG. 6 and then issuing the transformed command to the mini-disc recorder 20A.

That is to say, in this case, the local application module 77 issues a control code included in a command frame like one shown in FIG. 7.

The transformed command frame shown in FIG. 7 is obtained by extending the transformed command frame shown in FIG. 6. For example, in an operation code at an offset address of 02h, a vendor-dependent code determined by a format license issuer of the apparatus connected to the personal computer 1, that is, the mini-disc recorder 20A in this case, as well as a vendor-dependent code determined by an apparatus manufacturer, that is, the manufacturer of the mini-disc recorder 20A in this case, is declared.

Locations at an offset address of 06h and subsequent offset addresses are used as fields each available for describing the local command's information such as the actual control code (and arguments) with a high degree of freedom.

At offset addresses of 03h to 05h, a company unique code is prescribed in accordance with typically IEEE specifications as a company ID. The company ID is the code of the manufacturer of the mini-disc recorder 20A connected to the personal computer 1. The manufacturer is defined as the format licenser or a licensee.

When the local application module 77 issues such a transformed command, the switching function 76 is positioned on a t3 side and the switching function 75 is positioned on a t2 side allowing the device driver 74 to pass on the transformed command to the mini-disc recorder 20A by way of the device driver 74. The local application module 77, the switching functions 76 and 75, and the device driver 74 thus control functions unique to the mini-disc recorder 20A.

Since a transformed command issued by the command transformation module 73 has the same command frame structure as a transformed command issued by the local application module 77, a firmware application of the mini-disc recorder 20A is capable of accepting the transformed commands by using a common interpretation module.

By providing the common application module 70 and the local application module 77 as described above, with the mini-disc recorder 20A connected to the personal computer 1, it is possible to control not only check-outs and check-ins, but also processing peculiar to the mini-disc recorder 20A such as a process to edit contents recorded on the mini-disc recorder 20A. However, there is also a case in which the local application module 78 is used for issuing a local command as it is instead of issuing a transformed command frame as is the case with the local application module 77 in advance.

Thus, this embodiment also includes the local application module 78 having a module structure for issuing a local command as it is without transforming the command as described above.

As explained earlier, the personal computer 1 is connected to the mini-disc recorder 20A by using a transmission line such as the USB. With a transmission line such as the USB, bmRequestType and bRequest fields are provided as shown in a send control command of FIG. 8A and a receive response command of FIG. 8B.

These fields are used for indicating whether the command including these fields is a control command issued from an application in the personal computer 1 to the secondary-recording-medium-side apparatus 20A or 20B or a response command received by an application in the personal computer 1 from the secondary-recording-medium-side apparatus 20A or 20B.

To put it concretely, if the MSB of the bmRequestType field is 0 as shown in FIG. 8A, the command including this field is sent from the personal computer 1 to the secondary-recording-medium-side apparatus 20A or 20B in the so-called send direction. If the MSB of the bmRequestType field is 1 as shown in FIG. 8B, on the other hand, the command including this field is sent to the personal computer 1 from the secondary-recording-medium-side apparatus 20A or 20B in the so-called receive direction.

In addition, if the bRequest field is 80h as shown in FIG. 8A, the command including this field is a control command. If the bRequest field is 81h as shown in FIG. 8B, on the other hand, the command including this field is a response command.

Thus, the command structure shown in FIG. 8A is the structure of a control command sent from the personal computer 1 to the secondary-recording-medium-side apparatus 20A or 20B. On the other hand, the command structure shown in FIG. 8B is the structure of a response command sent to the personal computer 1 by the secondary-recording-medium-side apparatus 20A or 20B.

The control command shown in FIG. 8A is a common command sent from an application in the personal computer 1 to the secondary-recording-medium-side apparatus 20A or 20B for the purpose of mainly carrying out a check-out or a check-in. On the other hand, the response command shown in FIG. 8B is a command issued by the secondary-recording-medium-side apparatus 20A or 20B to the application in the personal computer 1 in response to the common command.

The structures of a local control command issued by the local application module 78 and a local response command to the local control command are obtained by extending the command structures shown in FIGS. 8A and 8B respectively.

The structures of the local control command issued by the local application module 78 and the local response command to the local control command are shown in FIGS. 9A and 9B respectively.

As shown in these figures, a bRequest field of FFh indicates that the command including this field is a local control command issued by the local application module 78 or a local response command issued in response to the local control command. The manufacturer of the mini-disc recorder 20A freely determines whether or not the local application module 78 is to be used.

It is to be noted that the MSB of the bmRequestType field reveals the command direction as described above. Thus, in this embodiment, the command structure shown in FIG. 9A is the structure of a local control command sent from the local application module 78 to the mini-disc recorder 20A. On the other hand, the command structure shown in FIG. 9B is the structure of a local response command sent to the local application module 78 by the mini-disc recorder 20A.

In addition, in the case of the local control and response commands shown in FIGS. 9A and 9B respectively, control and response data, which can be set by the apparatus manufacturer with a high degree of freedom, are each described in a field for vendor-dependent data.

In this case, when the local application module 78 issues such a local control command shown in FIG. 9A, the switching function 76 is positioned on a t4 side and the switching function 75 is positioned on a t2 side allowing the device driver 74 to pass on the local command to the mini-disc recorder 20A by way of the device driver 74.

By the same token, in order for the personal computer 1 to receive a local response command shown in FIG. 9B, the switching function 76 is positioned on a t4 side and the switching function 75 is positioned on a t2 side allowing the local command issued by the mini-disc recorder 20A to be supplied to the personal computer 1 by way of the device driver 74.

As described above, in accordance with the module structure shown in FIG. 5, control that is unique to an apparatus connected to the personal computer 1 and cannot be handled by the common application module 70 is executed by using the local application module 77 or 78. Since the device driver 74 can be shared by the common application module 70, the local application module 77 and the local application module 78, it is not necessary to introduce a new device driver for the local application module 77 and 78.

In addition, by using a module issuing a transformed command as is the case with the local application module 77, a process carried out by execution of firmware in the mini-disc recorder 20A can be simplified.

On the other hand, by issuing a local command like a command issued by the local application module 78, it is no longer necessary to issue an apparatus-dependent command with a format to be adjusted to that of a transformed command in advance.

A preferred embodiment has been described so far. However, the scope of the present invention is not limited to the embodiment.

In this embodiment, the local application modules 77 and 78 are each a module specially provided for the mini-disc recorder 20A. It is needless to say, however, that a local application module can be a module specially provided for the memory-card driver 20B in the configuration as shown in FIG. 5.

The secondary-recording-medium-side apparatus is of course not limited to the mini-disc recorder and the memory-card driver. That is to say, the secondary-recording-medium-side apparatus can be assumed to be an apparatus of another type. Examples of the secondary recording medium 100 of another type are a disc medium such as a CD-R, a CD-RW, a DVD-RAM, a DVD-R and a DVD-RW, a medium using a solid-state memory or a tape medium. Thus, the secondary-recording-medium-side apparatus can be assumed to be any one of various recording apparatus provided for any one of these various recording media. In this case, it is necessary to use a module suitable for an apparatus to which the secondary-recording-medium-side apparatus is to be connected.

As is obvious from the above description, in accordance with the present invention, a control code issued by a common application module for the purpose of mainly carrying out a check-out or a check-in is transformed by the transformation module in accordance with a connected apparatus. Then, the transformed control command is transmitted by way of a device driver. It is thus unnecessary to use an application module unique to the type of the connected apparatus.

As for a control code issued by a local application module for the purpose of mainly carrying out a process unique to a connected apparatus, the device driver cited above can be shared by the local application module. Thus, it is not necessary to carry out a process to switch the application from one to another every time processing is started.

In particular, the local application module issues a control code with a format adjusted to that of a transformed control code obtained as a result of the transformation module. Thus, the device driver can be shared by the common application module and the local application module with ease.

Even if the local application module presents that a local control code with a format different from that of a control code transformed by the transformation module is to be issued and issues the local control code, the device driver can still be shared. In this case, it is possible to implement a control technique for issuing local control codes with a high degree of freedom in accordance with the type of the connected apparatus.

The features described above allow the structure of modules used by the data transfer apparatus for controlling a data-recording apparatus connected to the data transfer apparatus to be simplified, and processing carried out by the data transfer apparatus to be made more efficient.

In addition, in accordance with the recording medium provided by the present invention, by using typically a personal computer, it is possible to easily implement a data transfer apparatus for executing an apparatus control method to give the effects described above.

What is claimed is:

1. An apparatus control method adopted by a data transfer apparatus to control a data-recording apparatus connected to said data transfer apparatus, wherein: said data transfer apparatus includes a primary recording medium in which contents data have been stored; said data-recording apparatus is capable of recording contents data onto a secondary recording medium; and the contents data stored on said primary recording medium can be transferred to said secondary recording medium by connecting said data-recording apparatus to said data transfer apparatus, wherein a first control procedure or a second control procedure is selectively executed in accordance with a control condition, said first control procedure including the steps of:
using a common application module to issue a first control code according to a common control condition independently of a type of said secondary recording medium;
using a transformation module to transform said first control code in accordance with said data-recording apparatus connected to said data transfer apparatus; and
transmitting the transformed control code to said data-recording apparatus connected to said data transfer apparatus by way of a device driver;

said second control procedure including the steps of:
using a local application module to issue a second control code in accordance with a control condition not prepared in said common application module; and
transmitting the issued second control code to said data-recording apparatus connected to said data transfer apparatus by way of said device driver.

2. An apparatus control method according to claim 1, wherein, in said second control procedure, said local application module issues the second control code having a format adjusted to that of the control code transformed by said transformation module.

3. An apparatus control method according to claim 1, wherein, in said second control procedure, said local application module presents that a local control code having a format different from that of the control code transformed by said transformation module is to be issued and issues the local control code.

4. A data transfer apparatus comprising:
primary-recording-medium-driving means for recording data onto a primary recording medium and reproducing data from said primary recording medium;
communication means for carrying out operations to exchange various kinds of data with an external data-recording apparatus for recording data onto a secondary recording medium and specially carrying out an operation to transfer contents data recorded on said primary recording medium; and
connected-apparatus control means for transmitting a control code to a variety of data-recording apparatus connectable to said data transfer apparatus in a state of being capable of communicating with said data transfer apparatus through said communication means, and for controlling the data-recording apparatus connected to said data transfer apparatus,
wherein said connected-apparatus control means includes:
a common application module for issuing a control code according to a common control condition independently of a type of said secondary recording medium;
a transformation module for transforming said control code issued by said common application module in accordance with the data-recording apparatus connected to said data transfer apparatus;
a local application module for issuing a control code in accordance with a control condition not prepared in said common application module; and
a device driver for transmitting the transformed control code transformed by said transformation module and the issued control code issued by said local application module to the data-recording apparatus connected to said data transfer apparatus.

5. A data transfer apparatus according to claim 4, wherein said local application module issues the control code having a format adjusted to that of the control code transformed by said transformation module.

6. A data transfer apparatus according to claim 4, wherein said local application module presents that a local control code having a format different from that of the control code transformed by said transformation module is to be issued and issues the local control code.

7. A recording medium for a recording program module to be executed by a data transfer apparatus including a primary recording medium in which contents data have been stored, in order to control a data-recording apparatus which is connected to said data transfer apparatus and which is used for recording contents data onto a secondary recording medium in a state allowing contents data recorded on said primary recording medium to be transferred to said secondary recording medium by connecting said data-recording apparatus to said data transfer apparatus, said program module comprising:

a common application module for issuing a control code according to a common control condition independently of a type of said secondary recording medium;

a transformation module for transforming said control code issued by said common application module in accordance with the data-recording apparatus connected to said data transfer apparatus;

a local application module for issuing a control code in accordance with a control condition not prepared in said common application module; and a device driver for transmitting the transformed control code transformed by said transformation module and the issued control code issued by said local application module to the data-recording apparatus connected to said data transfer apparatus.

8. A recording medium according to claim 7, wherein said local application module issues the control code having a format adjusted to that of the control code transformed by said transformation module.

9. A recording medium according to claim 7, wherein said local application module presents that a local control code having a format different from that of the control code transformed by said transformation module is to be issued and issues the local control code.

* * * * *